(12) United States Patent
Biskeborn et al.

(10) Patent No.: US 8,988,835 B1
(45) Date of Patent: Mar. 24, 2015

(54) CONTACT RECORDING TUNNEL MAGNETORESISTIVE SENSOR WITH LAYER OF REFRACTORY METAL

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/053,514

(22) Filed: Oct. 14, 2013

(51) Int. Cl.
G11B 5/39 (2006.01)

(52) U.S. Cl.
CPC .................. *G11B 5/3909* (2013.01)
USPC .......... 360/324.2; 360/316; 360/121

(58) Field of Classification Search
USPC ....................... 360/324.2, 316, 121
See application file for complete search history.

(56) References Cited

U.S. PATENT DOCUMENTS

| | | | |
|---|---|---|---|
| 4,745,509 A * | 5/1988 | Watanabe et al. ........ 360/125.02 |
| 6,325,900 B1 | 12/2001 | Komuro et al. |
| 6,339,793 B1 | 1/2002 | Bostian et al. |
| 6,433,970 B1 * | 8/2002 | Knapp et al. ................. 360/322 |
| 6,780,524 B2 * | 8/2004 | Lin et al. ....................... 428/814 |
| 6,886,239 B2 * | 5/2005 | Kasahara et al. .......... 29/603.13 |
| 6,935,923 B2 * | 8/2005 | Burbank et al. .................. 451/5 |
| 7,111,382 B1 * | 9/2006 | Knapp et al. ............. 29/603.07 |
| 7,206,172 B2 * | 4/2007 | Ding et al. .................... 360/316 |
| 7,239,489 B2 * | 7/2007 | Lin et al. .................... 360/324.2 |
| 7,564,110 B2 * | 7/2009 | Beach et al. .................. 257/427 |
| 7,672,094 B2 | 3/2010 | Shatz et al. |
| 7,692,902 B2 * | 4/2010 | Amano et al. ............. 360/324.2 |
| 7,825,000 B2 * | 11/2010 | Kanakasabapathy et al. ............................. 438/401 |
| 8,125,040 B2 * | 2/2012 | Kang et al. .................... 257/422 |
| 8,151,441 B1 * | 4/2012 | Rudy et al. ................. 29/603.09 |
| 8,351,162 B2 * | 1/2013 | Etoh et al. ..................... 360/317 |
| 2002/0154456 A1 * | 10/2002 | Carey et al. .............. 360/324.11 |
| 2002/0186514 A1 * | 12/2002 | Childress et al. .......... 360/324.2 |
| 2007/0121254 A1 * | 5/2007 | Holman ...................... 360/324.1 |

(Continued)

OTHER PUBLICATIONS

Lohndorf et al., "Characterization of magnetostrictive TMR pressure sensors by MOKE", Center of Advanced European Studies and Research (caesar), Ludwig-Erhard-Allee 2, 53175 Bonn, Germany, 2007, pp. 223-225.

(Continued)

*Primary Examiner* — Brian Miller
(74) *Attorney, Agent, or Firm* — Zilka-Kotab, PC

(57) ABSTRACT

Various embodiments relate to an apparatus having a sensor with an active tunnel magnetoresistive region, magnetic shields flanking the tunnel magnetoresistive region, and gaps between the active tunnel magnetoresistive region and the magnetic shields. The active tunnel magnetoresistive region includes a free layer, a tunnel barrier layer and a reference layer. At least one of the gaps includes an electrically conductive layer having a refractory material. Other embodiments relate to an apparatus having a sensor with an active tunnel magnetoresistive region, magnetic shields flanking the tunnel magnetoresistive region, and gaps between the tunnel magnetoresistive region and the magnetic shields. The active tunnel magnetoresistive region includes a free layer, a tunnel barrier layer and a reference layer. At least one of the gaps includes an electrically conductive layer having a modified region at a media facing side thereof, the modified region being at least one of nonconductive and mechanically hardened.

20 Claims, 11 Drawing Sheets

(56) References Cited

U.S. PATENT DOCUMENTS

| | | |
|---|---|---|
| 2008/0151439 A1 | 6/2008 | Pinarbasi |
| 2009/0122450 A1* | 5/2009 | Wang et al. ................ 360/324.2 |
| 2010/0073827 A1* | 3/2010 | Zhao et al. ................ 360/324.2 |
| 2010/0177449 A1 | 7/2010 | Zhao et al. |
| 2012/0127615 A1 | 5/2012 | Hong et al. |
| 2013/0065075 A1 | 3/2013 | Pruegl et al. |

OTHER PUBLICATIONS

Reiss et al., "Magnetoresistive sensors and magnetic nanoparticles for biotechnology", Department of Physics, University of Bielefeld, 33501 Bielefeld, Germany, 2005, pp. 3294-3302.

U.S. Appl. No. 13/624,466, filed Sep. 21, 2012.

U.S. Appl. No. 13/624,484, filed Sep. 21, 2012.

* cited by examiner

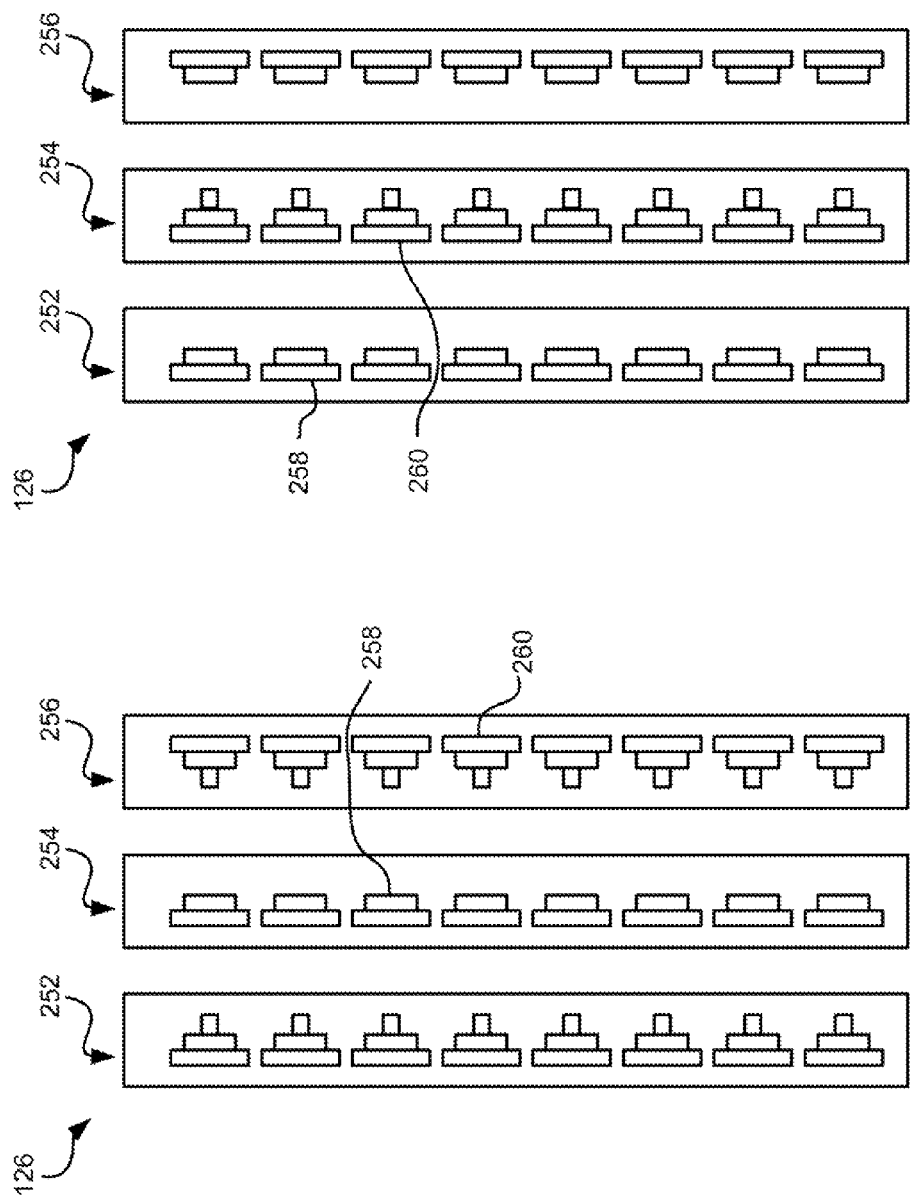

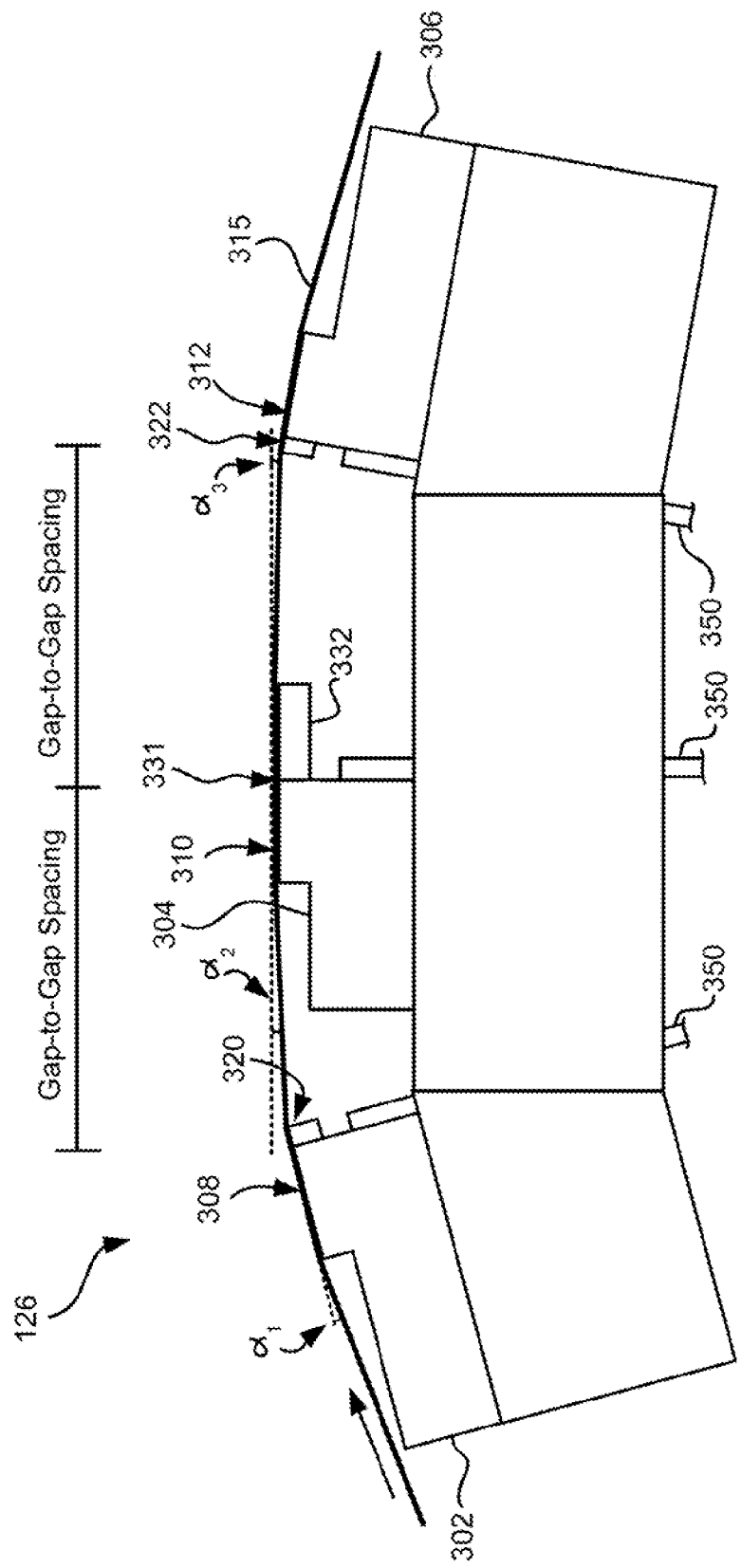

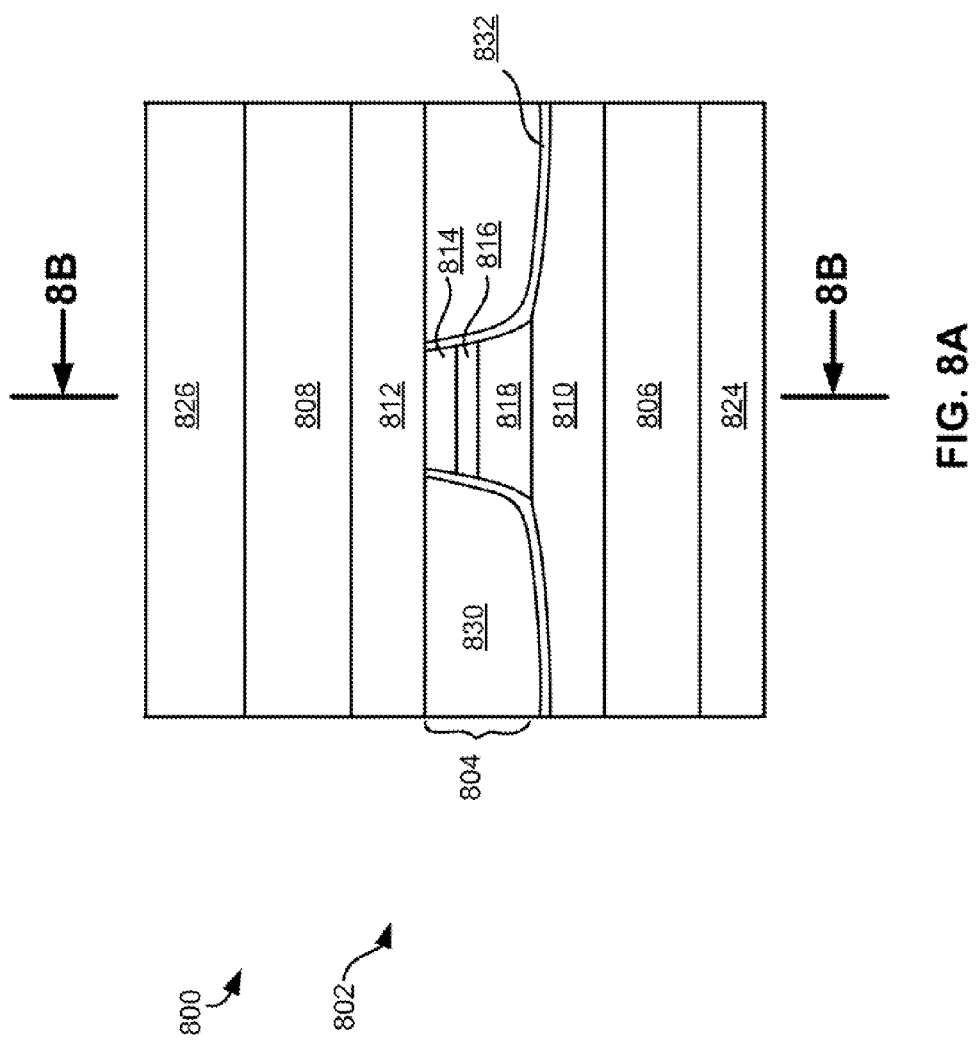

us 8,988,835 B1

CONTACT RECORDING TUNNEL MAGNETORESISTIVE SENSOR WITH LAYER OF REFRACTORY METAL

BACKGROUND

The present invention relates to data storage systems, and more particularly, this invention relates to tunnel magnetoresistive (TMR) sensors implemented in contact recording.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Minimization of the spacing between the head and the tape, however, induces frequent contact between the tape and the media facing side of the head, causing tape operations to be deemed a type of "contact recording." This contact, in view of the high tape speeds and tape abrasivity, quickly affects the integrity of the materials used to form the media facing surface of the head, e.g., causing wear thereto, smearing which is known to cause shorts, etc.

BRIEF SUMMARY

Various embodiments relate to an apparatus having a sensor with an active tunnel magnetoresistive region, magnetic shields flanking the tunnel magnetoresistive region, and gaps between the active tunnel magnetoresistive region and the magnetic shields. The active tunnel magnetoresistive region includes a free layer, a tunnel barrier layer and a reference layer. At least one of the gaps includes an electrically conductive layer having a refractory material.

Other embodiments relate to an apparatus having a sensor with an active tunnel magnetoresistive region, magnetic shields flanking the tunnel magnetoresistive region, and gaps between the tunnel magnetoresistive region and the magnetic shields. The active tunnel magnetoresistive region includes a free layer, a tunnel barrier layer and a reference layer. At least one of the gaps includes an electrically conductive layer having a modified region at a media facing side thereof, the modified region being at least one of nonconductive and mechanically hardened.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 7 is a side view of a magnetic tape head with three modules in an overwrap configuration.

FIG. 8A is a partial media facing side view of a sensor stack, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus has a sensor with an active tunnel magnetoresistive region, magnetic shields flanking the tunnel magnetoresistive region, and gaps between the active tunnel magnetoresistive region and the magnetic shields. The active tunnel magnetoresistive region includes a free layer, a tunnel barrier layer and a reference layer. At least one of the gaps includes an electrically conductive layer having a refractory material.

In another general embodiment, an apparatus has a sensor with an active tunnel magnetoresistive region, magnetic shields flanking the tunnel magnetoresistive region, and gaps between the tunnel magnetoresistive region and the magnetic shields. The active tunnel magnetoresistive region includes a free layer, a tunnel barrier layer and a reference layer. At least one of the gaps includes an electrically conductive layer having a modified region at a media facing side thereof, the modified region being at least one of nonconductive and mechanically hardened.

Figure 1A:
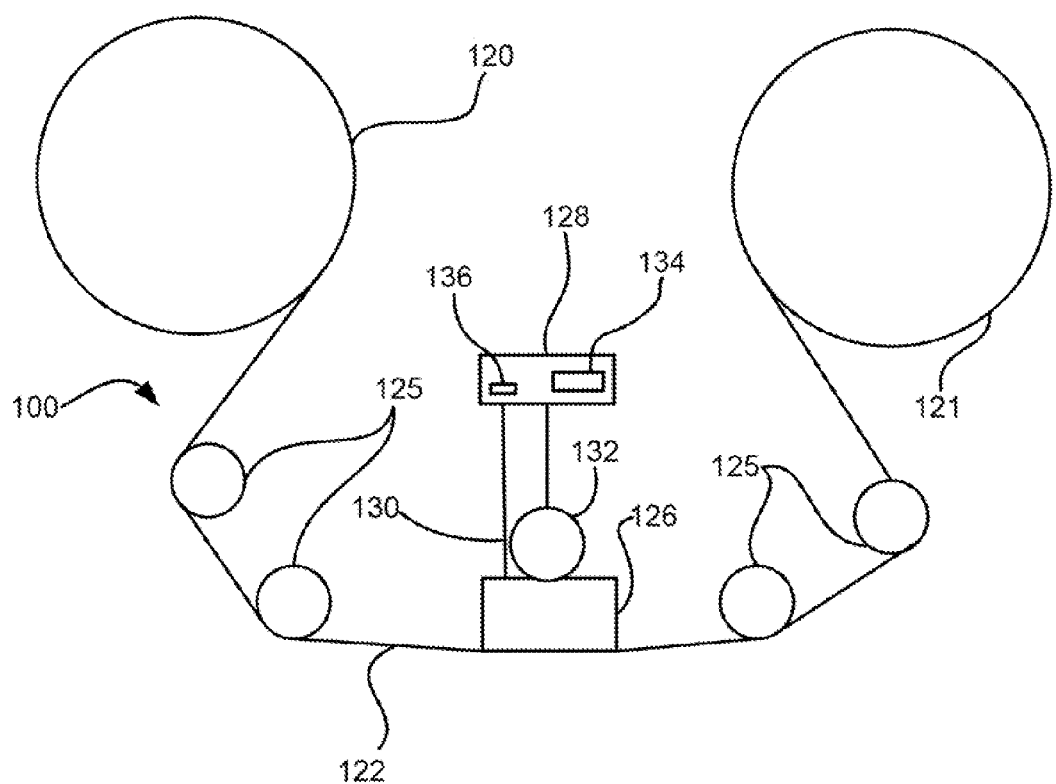
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
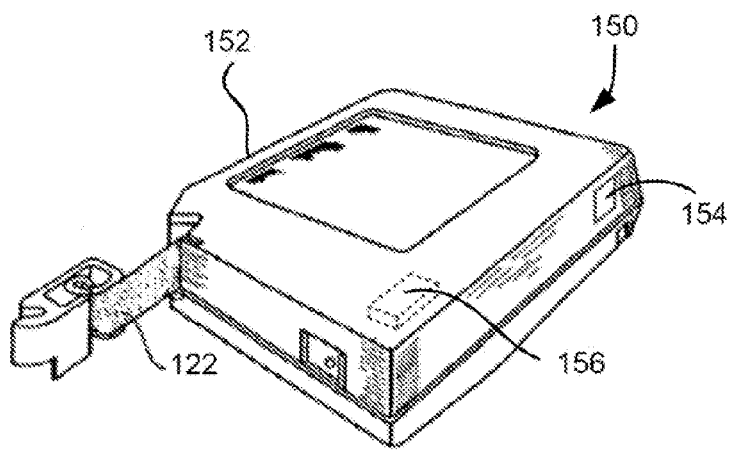
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
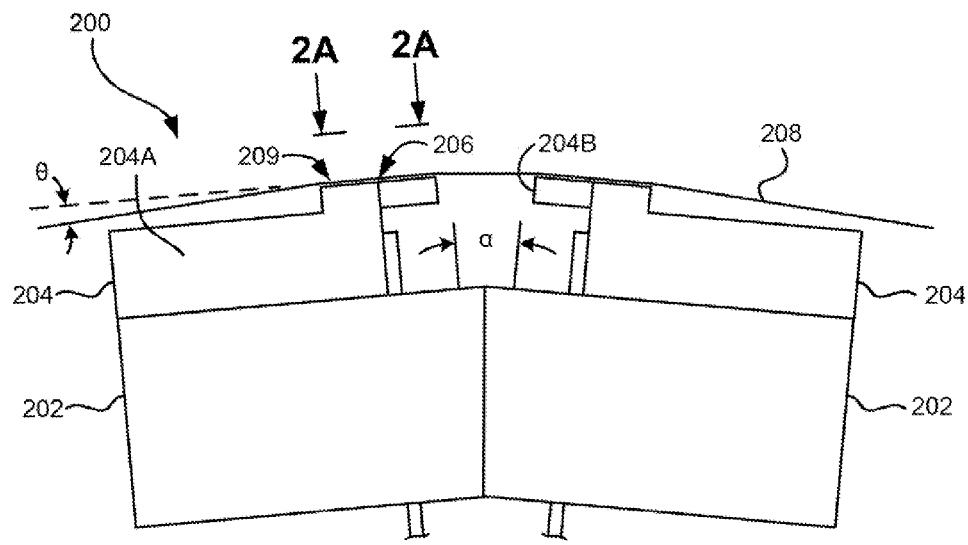
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle $\alpha$ with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle $\theta$ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
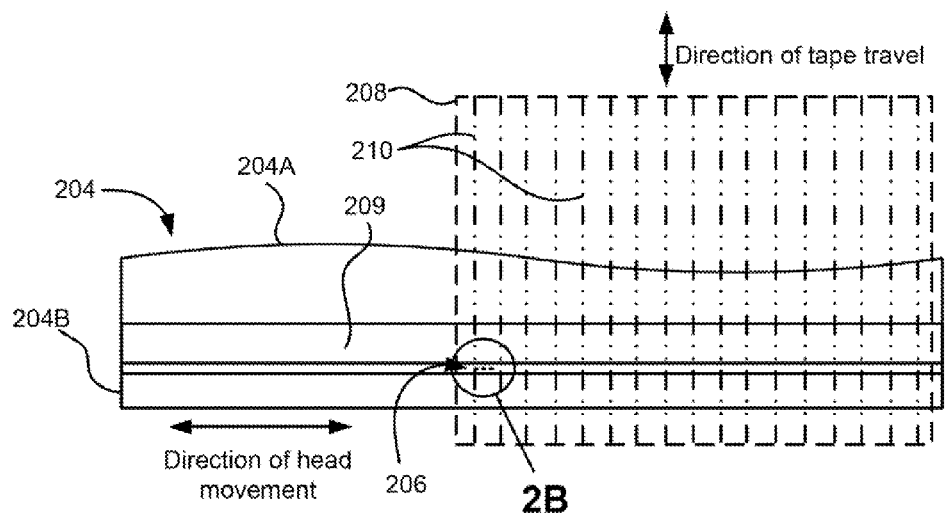
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
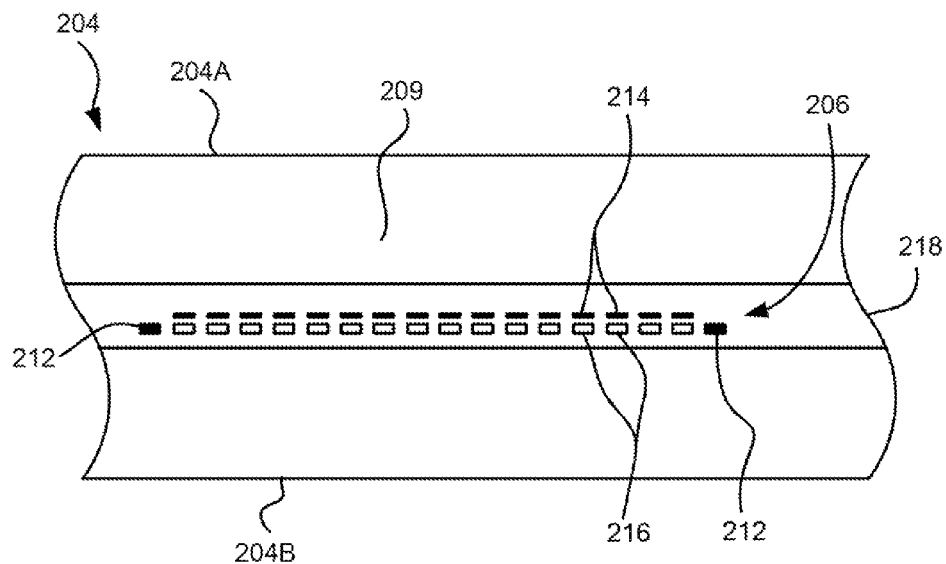
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
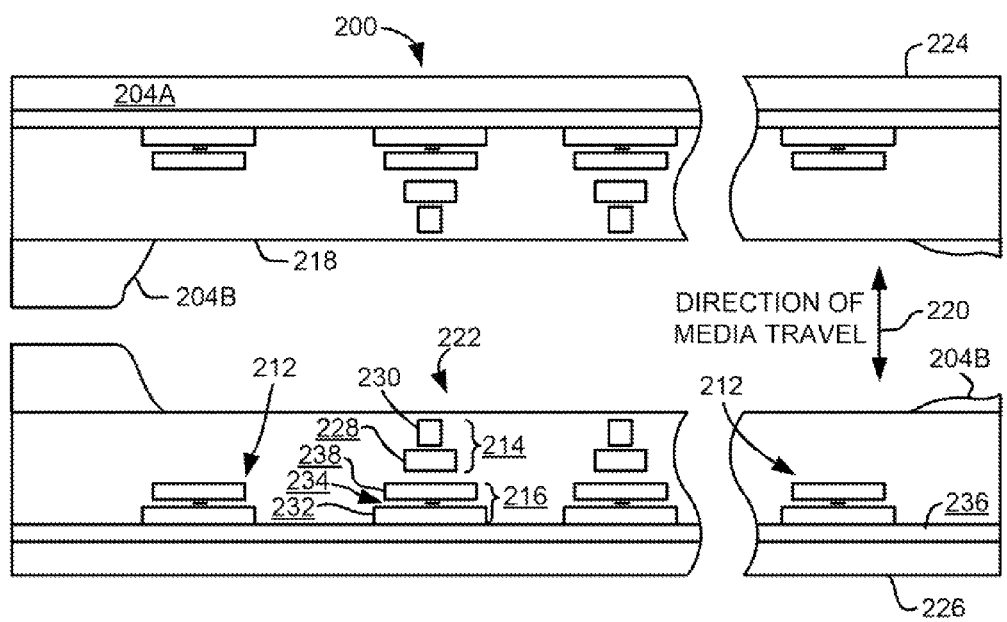
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
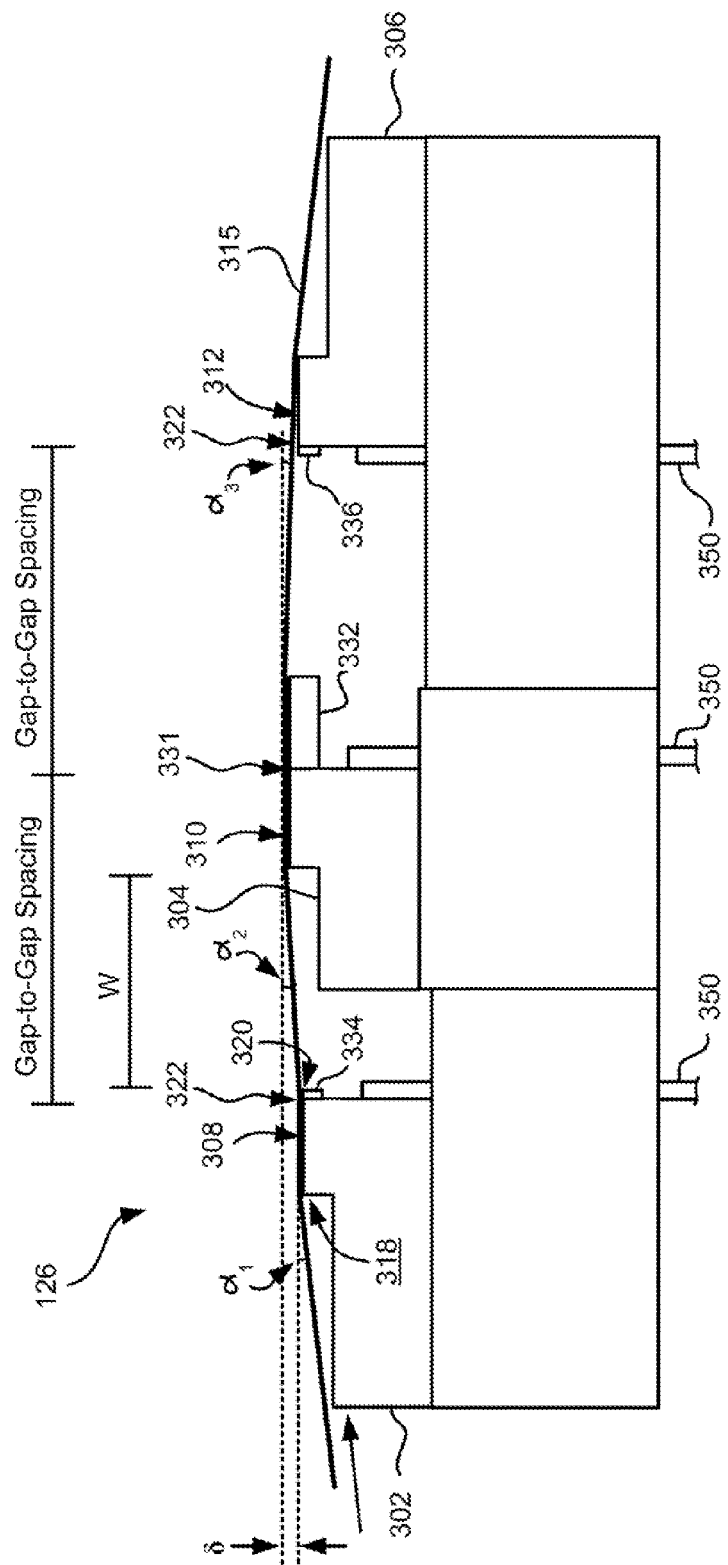
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
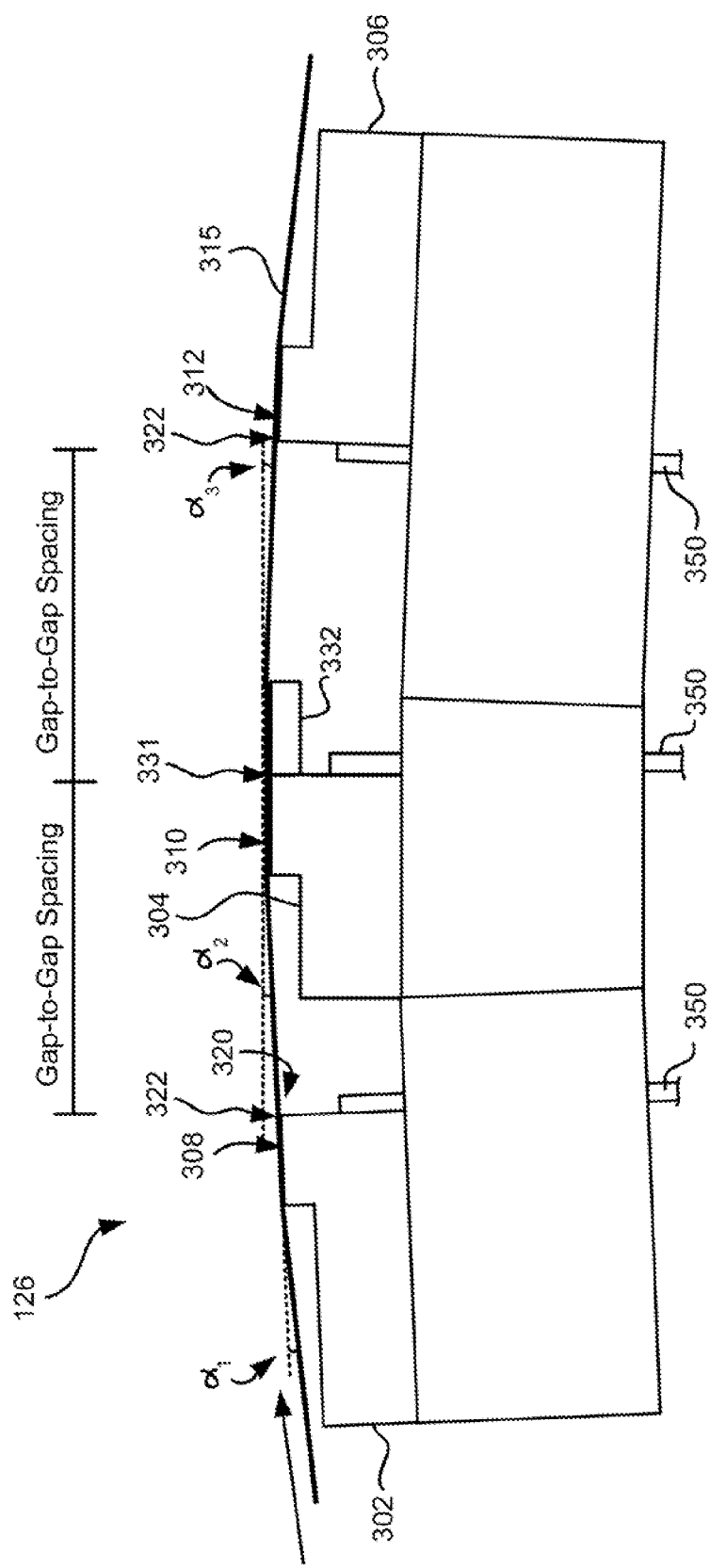
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

Conventional TMR structures have been developed strictly for non-contact recording, such as hard disk drive (HDD) recording. Because the head in non-contact recording flies above the medium, there is no need for robustness. However, conventional TMR structures pose a serious problem when implemented in contact recording environments, such as tape recording environments. Namely, contact between the magnetic medium and the sensor structure during contact recording may deform the sensor layers and/or lead structures, effectively smearing the material of each of these layers across the media facing side of the sensor structure, and thereby resulting in electrical shorting of the TMR device, which implements a parasitic current perpendicular to the plane (CPP) configuration. Once the device has been electrically shorted, it may be rendered useless.

Moreover, during the lapping that is performed to define the media-facing surface and establish the sensor stripe height, materials may smear, resulting in electrical shorts that significantly alter the performance of the finished head.

Materials, such as nickel-chrome alloys, used in the non-magnetic portion of the TMR sensor gap, have led to shorting. Various attempts to alleviate shorting in such conventional devices have resulted in diminished signal output thereby leading to reduced signal-to-noise ratio and/or resulted in otherwise non-optimal performance, ultimately leading to higher error rates, higher write skips and/or more frequent re-writes, loss of throughput and loss of capacity, all of which are highly undesirable.

For current-in-plane (CIP) devices such as AMR and GMR sensors, pre-recession processing selectively etches the magnetic shields, thus facilitating formation of protective insulating 'walls' that inhibit shorting due to tape-head contact. However, in CPP TMR sensors, there are no insulating films in the sensor stack itself, apart from the tunnel barrier, to allow this coating methodology to work. Thus, while effective for AMR and GMR sensors, these methods may not adequately protect against shorting for TMR sensors when implemented in contact recording environments.

In sharp contrast, various embodiments described and/or suggested herein include TMR sensors having an improved media facing interface thereby resulting in a high resistance to electrical shorting of the sensor and/or its leads. According to some embodiments, this improved media interface may be achieved through wafer level solutions, while in other embodiments, the improved media interface may result from a post wafer solution, as will be described in detail below.

Figure 8B:
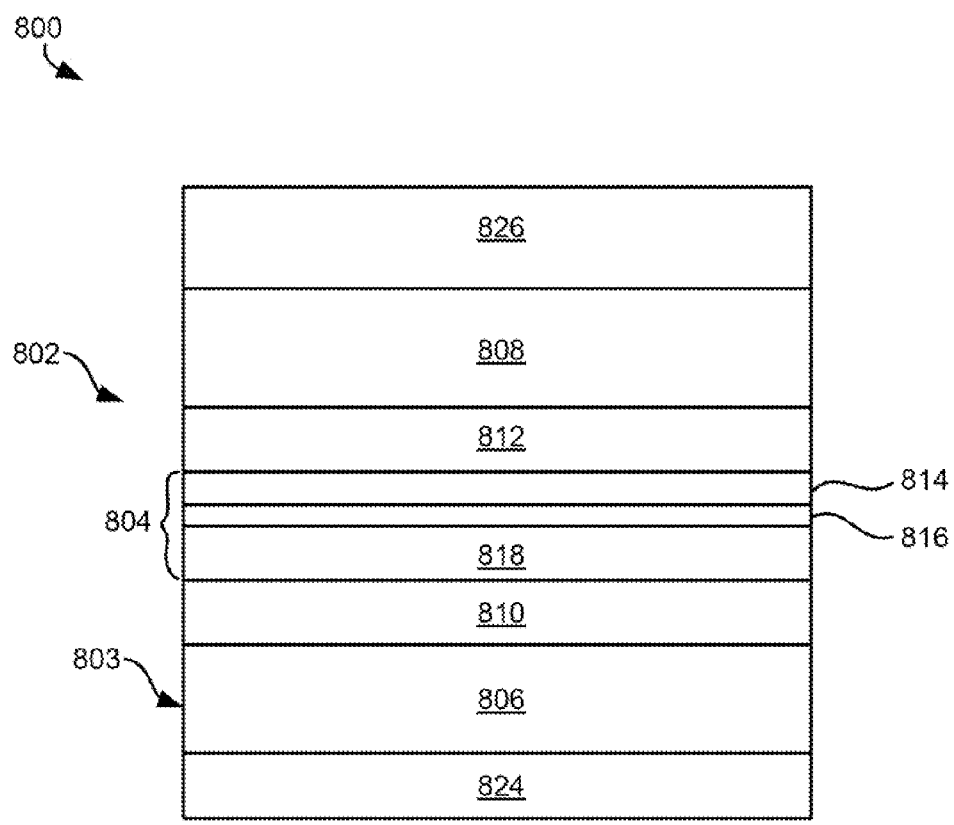
FIG. 8B is a partial cross-sectional view taken from Line 8B-8B of FIG. 8A.

Looking to FIGS. 8A-8B, an apparatus 800 is illustrated, in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8B (and the other FIGS.) should be deemed to include any and all possible permutations.

The apparatus 800 includes a sensor 802 having a media facing side 803, an active TMR region 804. The sensor 802 also includes magnetic shields 806, 808 flanking (sandwiching) the TMR region 804, and electrically conductive, non-magnetic gaps 810, 812 between the TMR region 804 and the magnetic shields 806, 808. Except as otherwise described herein, the various components of the apparatus of FIGS. 8A-8B may be of conventional materials and designs, as would be understood by one skilled in the art.

The apparatus 800 may also include overcoat and undercoat layers 824, 826, which may have any conventional construction, e.g., may include an alumina material.

Furthermore, the active TMR region 804 includes a free layer 814, a tunnel barrier layer 816 and a reference layer 818. According to various embodiments, the free layer 814, the tunnel barrier layer 816 and/or the reference layer 818 may include construction parameters, e.g., materials, dimensions, properties, etc., according to any of the embodiments described herein, and/or conventional construction parameters, depending on the desired embodiment. Illustrative materials for the tunnel barrier layer 816 include amorphous and/or crystalline forms of, but are not limited to, TiOx, MgO and $A_2O_3$.

An insulating layer 832 may be interposed between hard bias layers 830 and the active TMR region 804 to prevent parasitic current flow parallel to current flow through the sensor.

With continued reference to FIGS. 8A-8B, at least one of the gaps 810, 812 preferably includes an electrically conductive layer, which contain a refractory material. It should be noted that the gaps 810, 812 shown in the figures are representational, and do not depict the various potential layers therein that may cumulatively form the gaps 810, 812 according to various embodiments. Thus, according to some embodiments, one or both of the gaps 810, 812 may include layers in addition to the electrically conductive layer, including, but not limited to seed layers (e.g., Cr, Ta, etc.), nonmagnetic spacer layers, antiferromagnetic layers, etc. For example, a seed layer may be disposed between the refractory material and a surface underlying the refractory material. However, in other embodiments, the electrically conductive layer may form the whole of one or both gaps 810, 812.

Illustrative materials for the refractory material include metals, e.g., titanium-tungsten, tungsten carbide, rhodium, ruthenium, iridium, etc., and/or alloys thereof. However in other embodiments, the refractory material may include, but is not limited to, an electrically conductive oxide, a conductive nitride, and/or a conductive carbide. Further still, according to an illustrative embodiment, the refractory material may include a non-annealed sendust. Sendust composition is typically 85 at % iron, 9 at % silicon and 6 at % aluminum, but the ratios of the components may vary from these general concentrations.

Depending on the desired embodiment, the electrically conductive layer may be formed using a single refractory material, however, in other embodiments, the electrically conductive layer may have a layered structure. Thus, an electrically conductive layer may be formed from a number of sublayers, each of which may include a different refractory material according to any of those listed herein.

The layer of refractory material may be mechanically mismatched to the adjacent layers. For example, they may have different stress levels, which may affect adhesion. Accordingly, an adhesion layer may be employed to promote adhesion of the layer of refractory material to another layer in the structure. Conventional adhesion layers may be used. Examples include silicon nitride, Ta, Cr, Si, etc.

Another example of a mismatch could be related to the internal stress of the refractory material layer. The stress can be modified to some extent by controlling process conditions such as pressure, temperature, rate of deposition, etc. and/or inclusion of other materials that serve to reduce or otherwise alter the internal stress.

Furthermore, another consideration for the refractory material layer relates to the surface roughness of the final film, especially for such layer under the active TMR region. A processing step may be performed to reduce surface roughness, such as chemical mechanical polishing (CMP), etching or other surface treatment. Alternatively, the processing conditions for the refractory material layer can be tailored to minimize roughness. Controlling surface roughness of the lower refractory material layer may be particularly important to maintain the integrity of the tunnel barrier layer.

Illustrative thicknesses for the gaps 810, 812 and/or layer of refractory material therein may be from 10-70 nm per film, but could be higher or lower.

Figure 9:
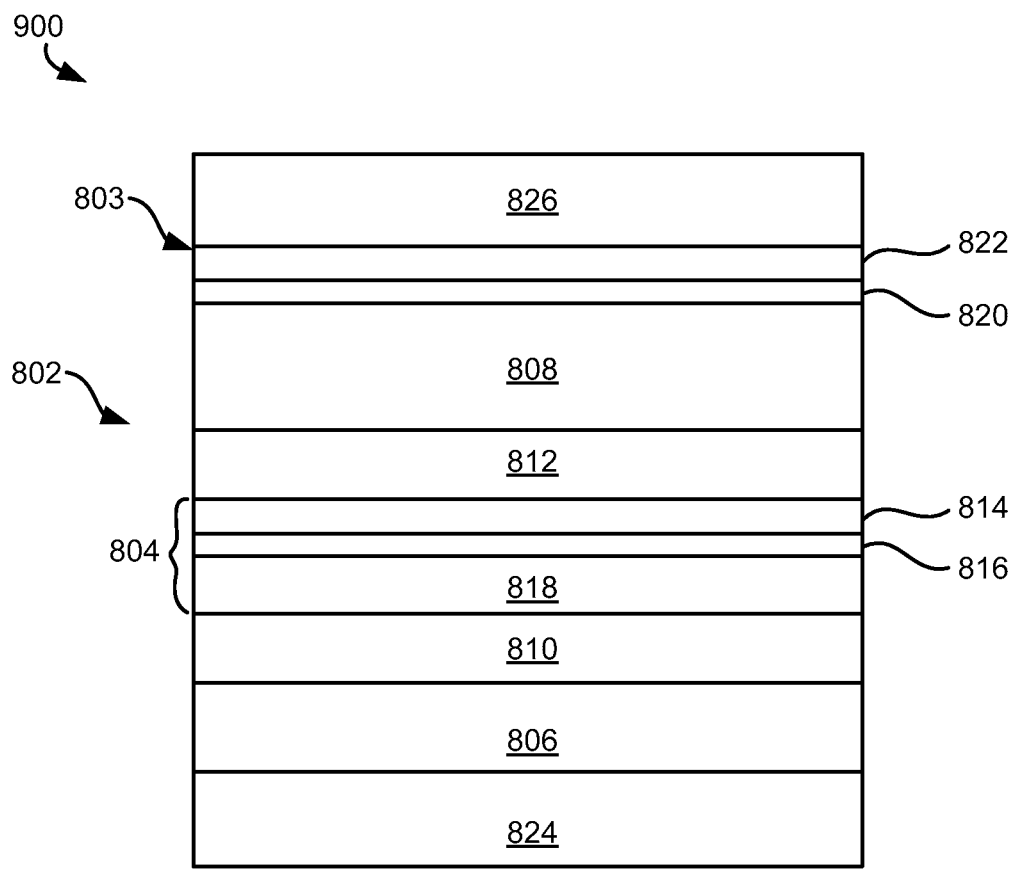
FIG. 9 is a partial side view of a sensor stack, according to one embodiment.

FIG. 9 depicts an apparatus 900 that is a variation of the embodiment of FIGS. 8A-8B, in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other FIGS.) should be deemed to include any and all possible permutations.

As shown, the apparatus 900 may further include a durable layer 822 above an upper one of the magnetic shields 808. In other embodiments, a durable layer 824 may additionally and/or alternatively be positioned below a lower one of the magnetic shields 806. The durable layer(s) 822, 824 may include a second refractory material. According to various embodiments, the second refractory material in such layer(s) may be the same as, or different than, the refractory material of the electrically conductive layer between the shields as described above. In other embodiments, the durable layer(s) 822, 824 may include a ferromagnetic layer of any suitable material, such as 45/55 NiFe. Thus, the durable layer(s) 822, 824 may provide a wear support structure, which desirably allows for an improved resistance to wear experienced on a media facing side of the sensor 802.

Moreover, although an electrically insulating separation layer 820 is shown in the present embodiment, e.g., to separate the durable layer 822 from the shield 808, in some embodiments, the insulating layer 820 may be omitted from the apparatus 900. Furthermore, the separation layer may be electrically connected to shield 808 or other structure, such as a substrate or closure, or voltage or current source.

Note that while much of the present description is presented in terms of a data transducer, the teachings herein may be applied to create electronic lapping guides (ELGs), such as TMR ELGs. In one embodiment, the ELG is unconventionally formed with shields, and with a TMR structure that may be otherwise conventional, but modified as taught herein. This provides enhanced immunity to shunting caused by scratching during lapping, which was previously not possible due to smearing of the shield material during lapping.

Although the embodiments of FIGS. 8A and 9 illustrate a single sensor 802, according to various other embodiments, an apparatus may include an array of the sensors sharing a common media-facing surface. Depending on the desired embodiment, the array of sensors may include any of the designs, e.g., materials, layer combinations, etc., described above.

Moreover, for embodiments including an array of the sensors sharing a common media-facing surface, the sensors may include any of those described herein, e.g., data readers, data writers, servo readers, etc. However, according to an exemplary embodiment, which is in no way intended to limit the invention, an array of sensors sharing a common media-facing surface may include only readers. In other words, no writers would be present on the common media-facing surface of the array of sensors. For example, there may be no writers on the module at all, e.g., see 254 of FIGS. 3 and 252, 256 of FIG. 4.

Figure 10:
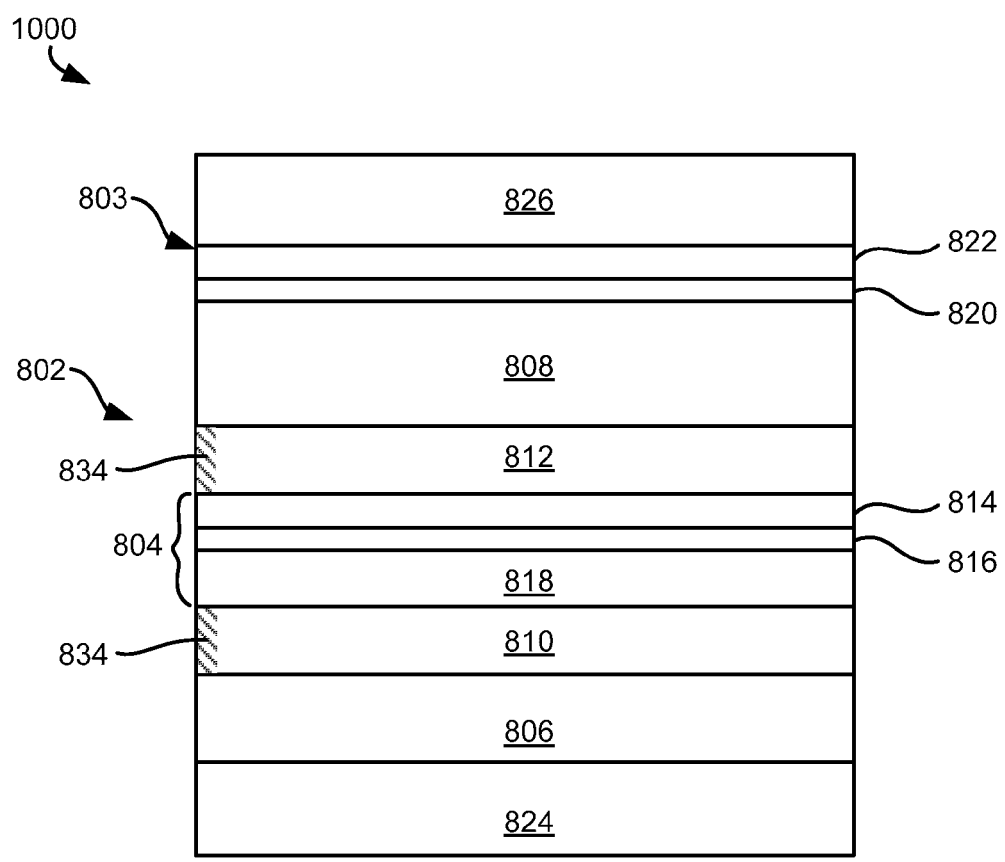
FIG. 10 is a partial side view of a sensor stack, according to one embodiment.

FIG. 10 depicts an apparatus 1000 that is a variation of the embodiment of FIG. 9, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment. Thus FIG. 10 (and the other FIGS.) should be deemed to include any and all possible permutations.

In other embodiments, an electrically conductive layer of at least one of the gaps 810, 812 and/or durable layers 822, 824 may have a modified region 834 at a media facing side thereof, e.g., such that the modified region 834 is at least one of nonconductive (e.g., electrically insulating) and mechanically hardened, where a mechanically hardened modified region is physically harder and/or less ductile than the unmodified region of the layer. Thus, the nonconductive modified region 834 is preferably able to prevent shorting caused by a magnetic medium coming into contact with the media facing side of the sensor stack while the magnetic medium is being passed thereover.

In one embodiment, the modified region may be an oxidized portion of the electrically conductive layer. In another embodiment, the modified region may be otherwise reacted by methods known in the art to alter surface characteristics such as by introduction of defects, which generally have less shorting propensity. The process of forming the modified region may include applying a surface treatment to the media facing side of the sensor 802, thereby preferably affecting the properties thereof. Thus, according to an exemplary embodiment, the electrically conductive layer may include aluminum, while the modified region includes aluminum oxide, e.g., crystalline aluminum oxide. Moreover, according to another illustrative embodiment, the electrically conductive layer may include magnesium or a magnesium aluminum alloy, while the modified region may include crystalline magnesium oxide.

Such oxide portions may be formed by depositing or otherwise promoting the formation of the oxide portion. In one example, the portion may be oxidized, followed by ion bombardment to promote conversion to crystalline form.

According to exemplary embodiments, a modified region may be formed by implementing various embodiments described in U.S. patent application Ser. No. 13/624,466, filed on Sep. 21, 2012 and U.S. patent application Ser. No. 13/624,484, filed on Sep. 21, 2012, which are herein incorporated by reference.

In other embodiments, the modified region may be formed by performing a surface etching processes and/or milling processes. The process may non-selectively remove non-gap metals that have an equal or lower removal rate than a refractory metal layer of the gap 810, 812.

It follows that such etching and/or milling processes may have an about equal or lower removal rate for one or more of the gaps 810, 812 that may include a refractory material therein. Moreover, these processes may additionally have a lower removal rate for the insulation gap between hard bias magnets and TMR stack and shields.

In some embodiments the hard bias magnets, typically comprised of cobalt, platinum and chrome, etch at a rate equal to or greater than the other metals in the transducer structure.

By including at least one electrically conductive layer having a refractory material, the sensor 802 as described herein gains low resistivity, low plasticity, low ductility, and high overall wear characteristics. It follows that by implementing such refractory materials as described above, the various embodiments of the present invention are able to successfully implement TMR sensors in contact recording environments.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    an array of sensors sharing a common media-facing surface, each sensor having an active tunnel magnetoresistive region, magnetic shields flanking the tunnel magnetoresistive region, and gaps between the active tunnel magnetoresistive region and the magnetic shields,
    wherein the active tunnel magnetoresistive region includes a free layer, a tunnel barrier layer and a reference layer,
    wherein at least one of the gaps includes an electrically conductive layer having a refractory material.

2. An apparatus as recited in claim 1, wherein the array of sensors includes at least eight sensors in a single magnetic head.

3. An apparatus as recited in claim 1, wherein no writers are present on the common media-facing surface.

4. An apparatus as recited in claim 1, wherein the refractory material includes a metal selected from a group consisting of tungsten, titanium-tungsten, tungsten carbide, rhodium, ruthenium and iridium, and alloys thereof.

5. An apparatus as recited in claim 1, wherein the sensor is an electronic lapping guide.

6. An apparatus as recited in claim 1, wherein the refractory material is selected from a group consisting of conductive oxide, a conductive nitride and a conductive carbide.

7. An apparatus as recited in claim 1, further comprising a seed layer disposed between the refractory material and a surface underlying the refractory material.

8. An apparatus as recited in claim 1, further comprising a layer of a second refractory material above an upper one of the magnetic shields and/or below a lower one of the magnetic shields.

9. An apparatus as recited in claim 1, wherein each sensor further includes a ferromagnetic layer above an upper one of the shields and/or below a lower one of the shields.

10. An apparatus as recited in claim 1, further comprising:
    a drive mechanism for passing a magnetic medium over the sensor; and
    a controller electrically coupled to the sensor.

11. An apparatus, comprising:
    a sensor having an active tunnel magnetoresistive region, magnetic shields flanking the tunnel magnetoresistive region, and gaps between the tunnel magnetoresistive region and the magnetic shields,
    wherein the active tunnel magnetoresistive region includes a free layer, a tunnel barrier layer and a reference layer,
    wherein at least one of the gaps includes an electrically conductive layer having a modified region at a media facing side thereof, the modified region being at least one of nonconductive and mechanically hardened.

12. An apparatus, comprising an array of sensors, each of the sensors being as recited in claim 11, the sensors sharing a common media-facing surface.

13. An apparatus as recited in claim 12, wherein no writers are present on the common media-facing surface.

14. An apparatus as recited in claim 13, wherein the modified region is an oxidized portion of the electrically conductive layer.

15. An apparatus as recited in claim 11, wherein the modified region is an oxidized portion of the electrically conductive layer.

16. An apparatus as recited in claim 11, wherein the electrically conductive layer includes aluminum, wherein the modified region includes aluminum oxide.

17. An apparatus as recited in claim 11, further comprising a layer of refractory material above an upper one of the magnetic shields and/or below a lower one of the magnetic shields.

18. An apparatus as recited in claim 17, wherein the refractory material includes a material selected from a group consisting of tungsten, titanium-tungsten, tungsten carbide, rhodium, ruthenium, iridium, a conductive oxide, a conductive nitride, a conductive carbide, and non-annealed sendust.

19. An apparatus as recited in claim 11, further comprising a ferromagnetic layer above an upper one of the magnetic shields and/or below a lower one of the magnetic shields.

20. An apparatus as recited in claim 11, further comprising:
    a drive mechanism for passing a magnetic medium over the sensor; and
    a controller electrically coupled to the sensor.

* * * * *